(12) United States Patent
Householder

(10) Patent No.: US 10,757,927 B2
(45) Date of Patent: Sep. 1, 2020

(54) FISHING EQUIPMENT STORAGE ASSEMBLY

(71) Applicant: Melvin Householder, Shavano Park, TX (US)

(72) Inventor: Melvin Householder, Shavano Park, TX (US)

( * ) Notice: Subject to any disclaimer, the term of this patent is extended or adjusted under 35 U.S.C. 154(b) by 252 days.

(21) Appl. No.: 16/043,879

(22) Filed: Jul. 24, 2018

(65) Prior Publication Data
US 2020/0029543 A1    Jan. 30, 2020

(51) Int. Cl.
*A01K 97/08* (2006.01)
*A01K 97/06* (2006.01)
*A45C 5/14* (2006.01)

(52) U.S. Cl.
CPC .............. *A01K 97/08* (2013.01); *A01K 97/06* (2013.01); *A45C 5/141* (2013.01)

(58) Field of Classification Search
CPC ......... A01K 97/08; A01K 97/06; A45C 5/141
USPC .............................................................. 43/26
See application file for complete search history.

(56) References Cited

U.S. PATENT DOCUMENTS

| | | | | |
|---|---|---|---|---|
| 908,903 A * | 1/1909 | Thornton | ............... | A01K 97/06 43/54.1 |
| 1,980,104 A * | 11/1934 | Silverspitz | ............. | A01K 97/08 43/26 |
| 2,097,185 A * | 10/1937 | Hall | ....................... | A01K 97/08 43/54.1 |
| 2,591,674 A * | 4/1952 | Chalker | ................. | A01K 97/08 220/324 |
| 2,640,622 A * | 6/1953 | Sabatino | ................ | A01K 97/08 220/521 |
| 2,650,449 A | 9/1953 | Suring | | |
| 3,138,891 A * | 6/1964 | Gottula | ................... | A01K 97/08 43/26 |
| 3,399,009 A * | 8/1968 | Slade | ..................... | A01K 97/08 312/244 |
| 3,606,372 A * | 9/1971 | Browning | ............... | A45C 5/14 280/47.17 |
| 3,802,113 A | 4/1974 | Gatto | | |
| 4,170,801 A * | 10/1979 | Ward | ..................... | A01K 97/08 114/343 |
| 4,643,302 A | 2/1987 | Baumgardner | | |
| 4,858,366 A * | 8/1989 | Rushton | ................ | A01K 97/08 43/26 |

(Continued)

FOREIGN PATENT DOCUMENTS

| EP | 3108749 A1 * | 12/2016 | ............. | A01K 97/10 |
|---|---|---|---|---|
| GB | 2038246 A * | 7/1980 | ............... | B62B 1/26 |

(Continued)

*Primary Examiner* — Christopher P Ellis

(57) ABSTRACT

A fishing equipment storage assembly includes a first case that has a length of at least 2.0 meters for accommodating a length of a fishing pole for storage. A pair of rollers is provided and each of the rollers is rotatably coupled to the first case to roll along a support surface for transporting the first case. A handle is coupled to and extends partially around the first case for gripping and thusly transporting the first case. A second case is coupled to the first case to contain fishing tackle for transporting the fishing tackle with the fishing pole. A third case is removably positionable on the second case for transporting the third case. the third case has fishing tackle is contained therein for transporting the fishing tackle.

5 Claims, 5 Drawing Sheets

(56) References Cited

U.S. PATENT DOCUMENTS

| | | | | |
|---|---|---|---|---|
| 4,918,853 A * | 4/1990 | Bascom | | A01K 97/01 135/901 |
| 5,159,777 A * | 11/1992 | Gonzalez | | A01K 97/08 280/47.19 |
| 5,203,815 A * | 4/1993 | Miller | | A01K 97/08 211/149 |
| 5,319,874 A * | 6/1994 | Vance | | A01K 97/08 206/315.1 |
| 5,340,135 A * | 8/1994 | Womberly | | B62B 1/10 280/47.19 |
| 6,119,858 A * | 9/2000 | Davidson | | A01K 97/08 190/109 |
| 6,283,288 B1 * | 9/2001 | Rich | | A01K 97/06 206/315.11 |
| D451,670 S | 12/2001 | Knorr | | |
| 6,467,779 B1 * | 10/2002 | Mills | | A01K 97/22 280/47.26 |
| 7,415,794 B1 | 8/2008 | Thompson | | |
| 9,832,985 B2 * | 12/2017 | Moore, Jr. | | A01K 97/08 |
| 10,149,537 B2 * | 12/2018 | Johnson | | A47B 81/005 |
| 10,375,944 B2 * | 8/2019 | Smigaj | | B60R 9/08 |
| 10,624,454 B1 * | 4/2020 | Kreinest | | B62B 3/04 |
| 2005/0034949 A1 | 2/2005 | Davies | | |
| 2005/0235552 A1 * | 10/2005 | Gibson | | A01K 97/08 43/54.1 |
| 2007/0045973 A1 * | 3/2007 | Grosso | | B62B 1/264 280/47.26 |
| 2009/0165358 A1 | 7/2009 | Tough | | |
| 2011/0239525 A1 * | 10/2011 | Morales | | A01K 97/06 43/54.1 |
| 2013/0255132 A1 * | 10/2013 | Sela | | F41C 33/06 43/26 |
| 2014/0068998 A1 * | 3/2014 | Peak | | A01K 97/08 43/55 |
| 2014/0165450 A1 * | 6/2014 | London | | A01K 97/10 43/54.1 |
| 2014/0175092 A1 * | 6/2014 | Boyles | | F41C 33/06 220/8 |
| 2015/0021871 A1 * | 1/2015 | Thornberg | | A01K 97/08 280/47.26 |
| 2015/0150231 A1 * | 6/2015 | Norman | | A01K 97/08 43/17.5 |

FOREIGN PATENT DOCUMENTS

| | | | | |
|---|---|---|---|---|
| GB | 2051564 A * | 1/1981 | | A01K 97/08 |
| WO | WO-2007083391 A1 * | 7/2007 | | A01K 97/08 |
| WO | WO-2019130370 A1 * | 7/2019 | | A01K 97/08 |

* cited by examiner

FISHING EQUIPMENT STORAGE ASSEMBLY

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to storage devices and more particularly pertains to a new storage device for storing and transporting fishing equipment.

BRIEF SUMMARY OF THE INVENTION

An embodiment of the disclosure meets the needs presented above by generally comprising a first case that has a length of at least 2.0 for accommodating a length of a fishing pole for storage. A pair of rollers is provided and each of the rollers is rotatably coupled to the first case to roll along a support surface for transporting the first case. A handle is coupled to and extends partially around the first case for gripping and thusly transporting the first case. A second case is coupled to the first case to contain fishing tackle for transporting the fishing tackle with the fishing pole. A third case is removably positionable on the second case for transporting the third case. the third case has fishing tackle is contained therein for transporting the fishing tackle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
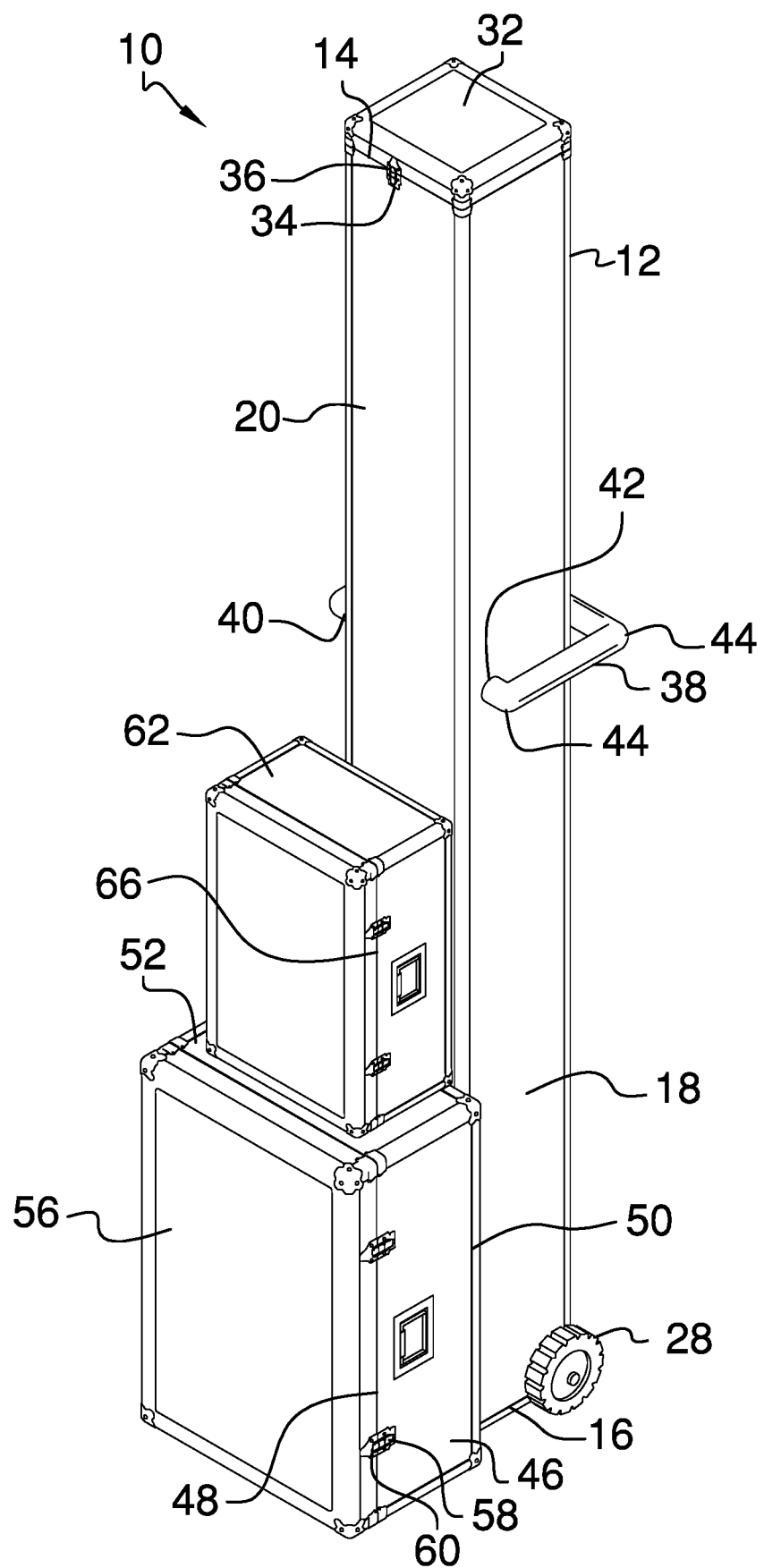
FIG. 1 is a front perspective view of a fishing equipment storage assembly according to an embodiment of the disclosure.
Figure 2:
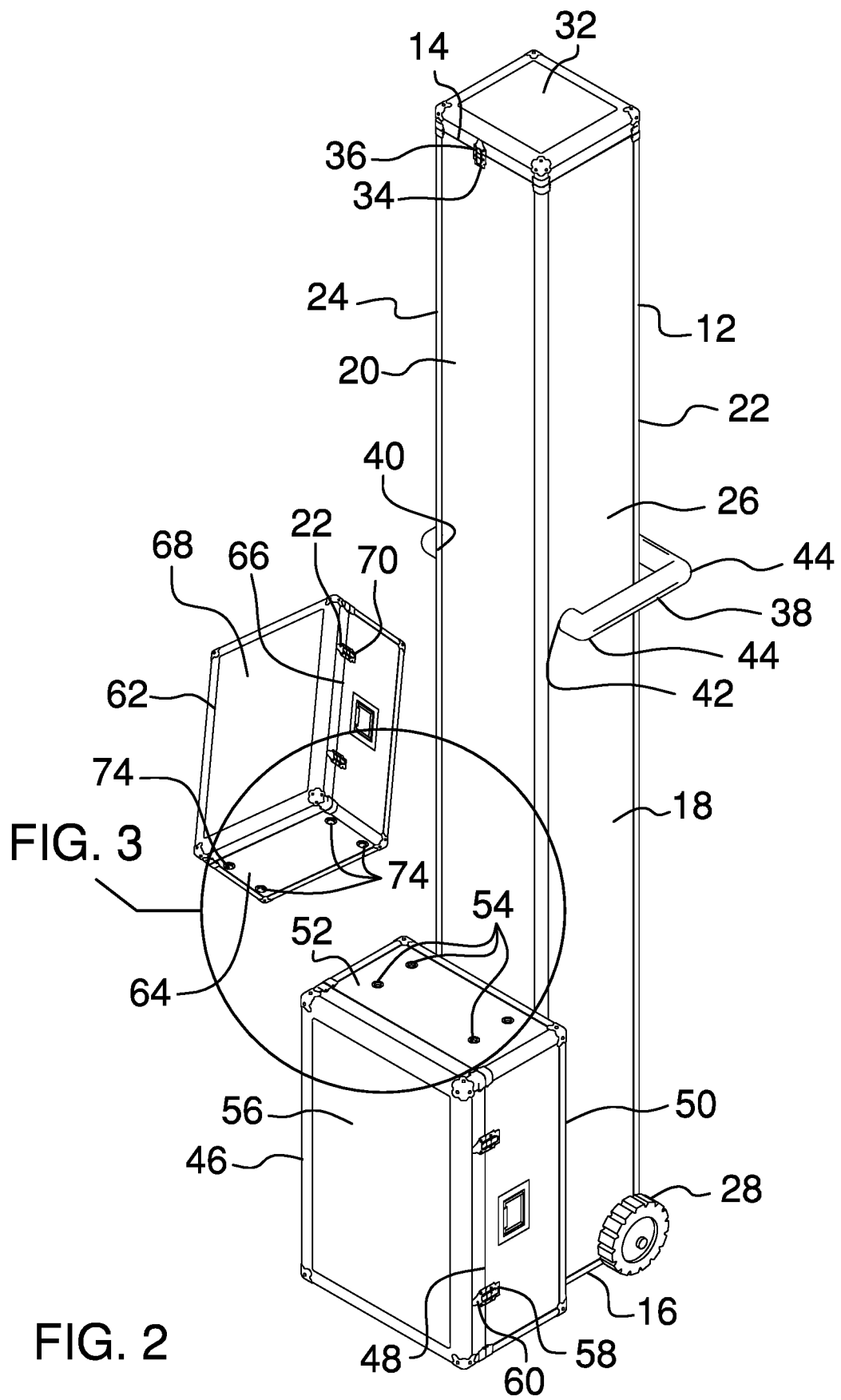
FIG. 2 is an exploded front perspective view of an embodiment of the disclosure.
Figure 3:
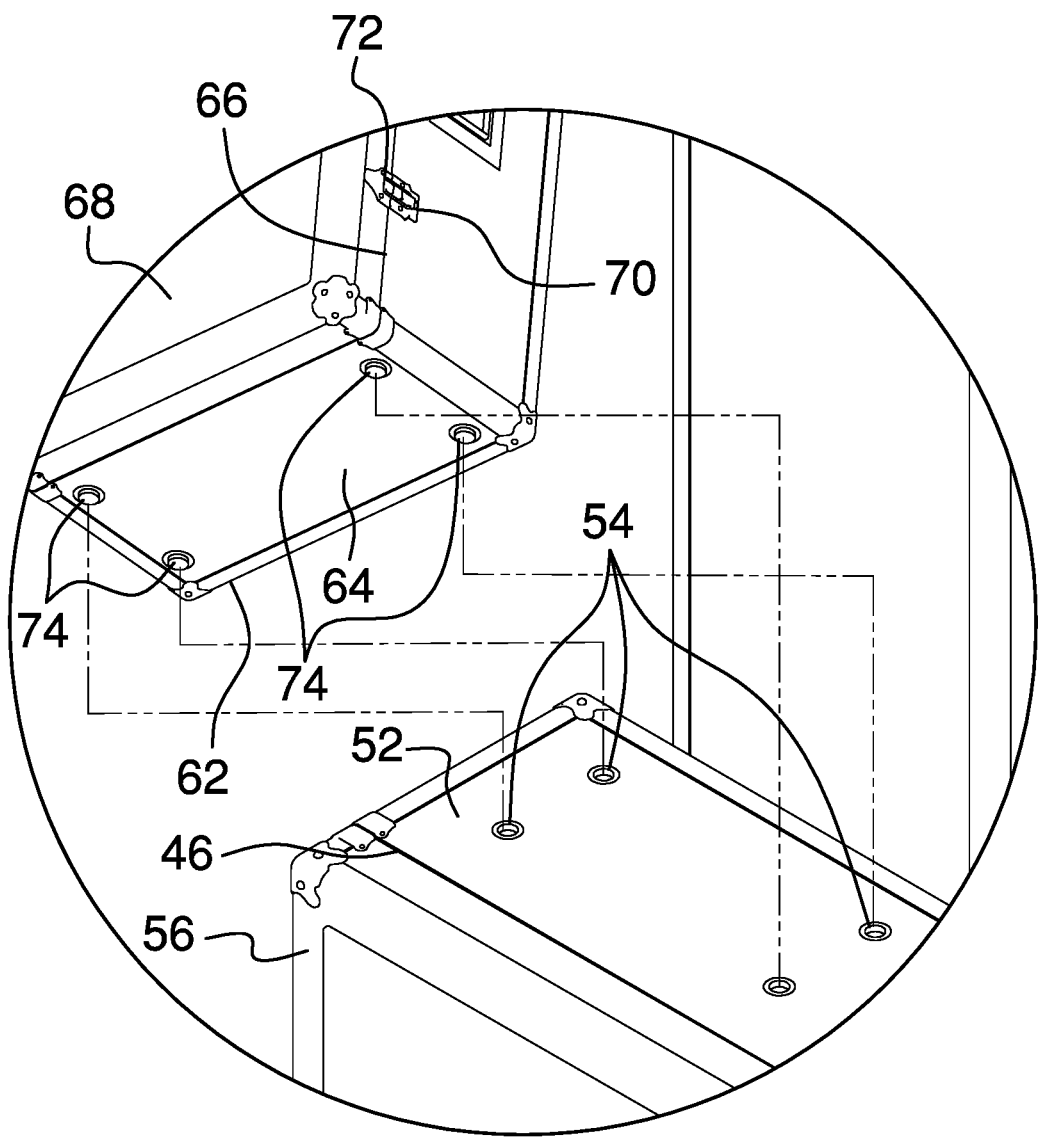
FIG. 3 is a detail view taken from circle 3 of FIG. 2 of an embodiment of the disclosure.
Figure 4:
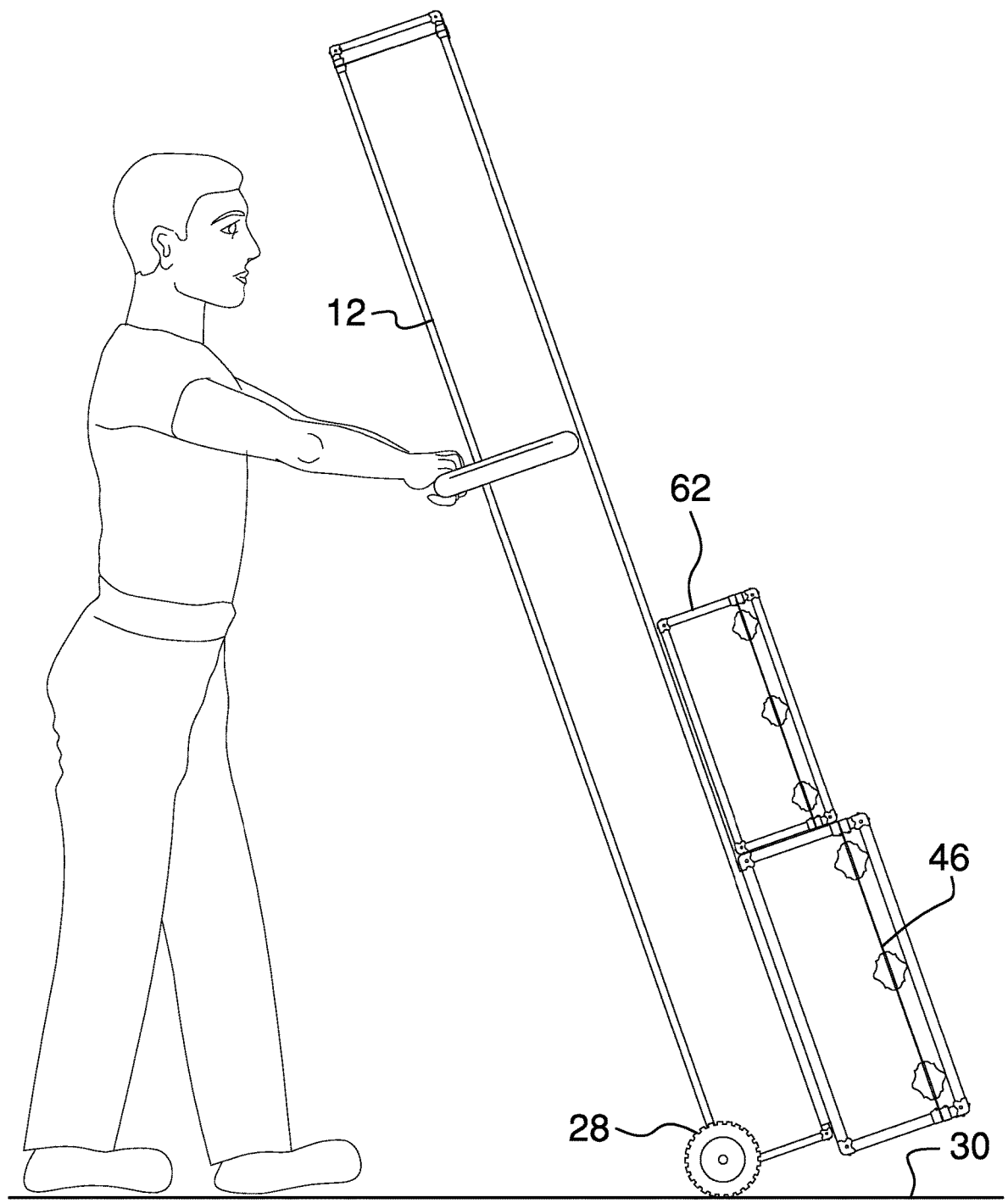
FIG. 4 is a perspective in-use view of an embodiment of the disclosure.
Figure 5:
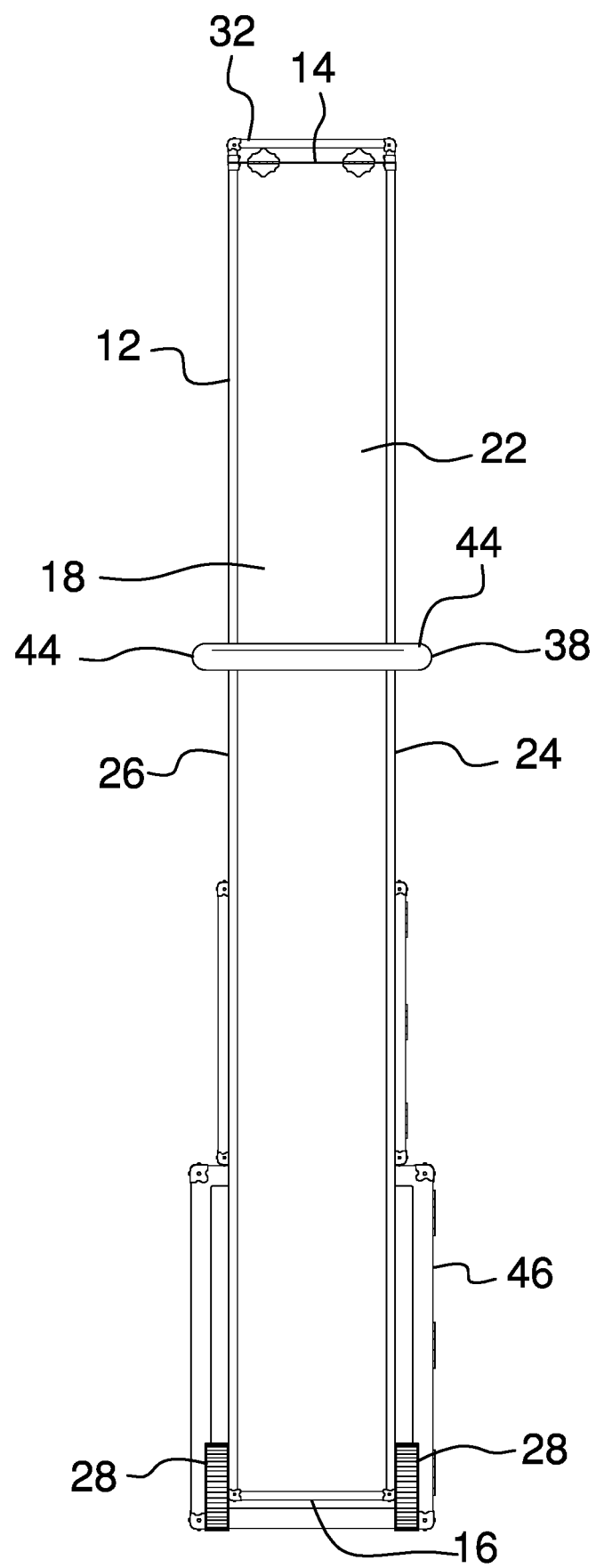
FIG. 5 is a back view of an embodiment of the disclosure.

With reference now to the drawings, and in particular to FIGS. 1 through 5 thereof, a new storage device embodying the principles and concepts of an embodiment of the disclosure and generally designated by the reference numeral 10 will be described.

As best illustrated in FIGS. 1 through 5, the fishing equipment storage assembly 10 generally comprises a first case 12 that has a length of at least 2.0 for accommodating a length of a fishing pole for storage. The first case 12 has a top end 14, a bottom end 16 and an outer wall 18 extending therebetween. The outer wall 18 has a front side 20, a back side 22, a first lateral side 24 and a second lateral side 26. The first case 12 is comprised of a rigid material for protecting the fishing pole from impact damage.

A pair of rollers 28 is each rotatably coupled to the first case 12 to roll along a support surface 30 for transporting the first case 12. Each of the rollers 28 is positioned on a respective one of the first 24 and second 26 lateral sides of the outer wall 18 of the first case 12, and each of the rollers 28 is aligned with the bottom end 16 of the first case 12. A first lid 32 is hingedly coupled to the first case 12 for closing the first case 12. The first lid 32 is positionable in a closed position for closing the top end 14 and the first lid 32 is positionable in an open position to expose the top end 14. A first clasp 34 is coupled to the outer wall 18 of the first case 12 and a first lock 36 is movably coupled to the first lid 32. The first lock 36 releasably engages the first clasp 34 when the first lid 32 is closed to lock the first lid 32.

A handle 38 is coupled to and extends partially around the first case 12 for gripping and thusly transporting the first case 12. The handle 38 has a first end 40 and a second end 42, and each of the first 40 and second 42 ends is coupled to a respective one of the first 24 and second 26 lateral sides of the outer wall 18 of the first case 12. The handle 38 has a sequence of bends 44 thereon such that the handle 38 extends around the back side 22 of the outer wall 18 of the first case 12. Moreover, the handle 38 is centrally positioned between the top 14 and bottom 16 ends of the first case 12.

A second case 46 is coupled to the first case 12 and the second case 46 may contain fishing tackle for transporting the fishing tackle with the fishing pole. The second case 46 is comprised of a rigid material for protecting the fishing tackle from impact damage. The second case 46 has a front end 48, a back end 50 and a top side 52. The front end 48 is open and the back end 50 is coupled to the front side 20 of the outer wall 18 of the first case 12. The second case 46 extends upwardly from the bottom end 16 of the first case 12 and the front end 48 is open for receiving the fishing tackle. The top side 52 has a plurality of wells 54 each extending downwardly therein and the wells 54 are aligned with a respective one of four corners of the top side 52. The second case 46 has a height that is less than a height of the first case 12.

A second lid 56 is hingedly coupled to the second case 46 for closing the second case 46. The second lid 56 is positionable in a closed position to close the front end 48 and the second lid 56 is positionable in an open position to expose the front end 48. A second clasp 58 is coupled to the outer wall 18 of the second case 46 and a second lock 60 is movably coupled to the second lid 56. The second lock 60 releasably engages the second clasp 58 to lock the second lid 56.

A third case 62 is removably positionable on the second case 46 for transporting the third case 62. The third case 62 may contain fishing tackle for transporting the fishing tackle. The third case 62 has a bottom side 64 and a forward side 66, and the forward side 66 is open. The third case 62 is comprised of a rigid material for protecting the fishing tackle from impact damage. Additionally, the third case 62 has a height that is less than a height of the second case 46.

A third lid 68 is hingedly coupled to the third case 62 for closing the third case 62. The third lid 68 is positionable in an open position to expose the forward side 66 and the third lid 68 is positionable in a closed position to close the forward side 66. A third clasp 70 is coupled to the third case 62, a third lock 72 is movably coupled to the third lid 68 and the third lock 72 releasably engages the third clasp 70 to lock the third lid 68. A plurality of pegs 74 is provided and each of the pegs 74 is coupled to and extends downwardly from the bottom side 64 of the third case 62. Each of the wells 54 in the second case 46 insertably receives a respective one of the pegs 74 when the third case 62 is positioned on the second case 46 such that the third case 62 is inhibited from sliding off of the second case 46.

In use, the fishing pole is inserted into the top end 14 of the first case 12 for storage and transportation. The first lid 32 is closed and the first lock 36 is manipulated to lock the first lid 32. The fishing tackle is positioned in the second case 46, the second lid 56 is closed and the second lock 60 is manipulated to lock the second lid 56. The third case 62 is positionable on the second case 46 or the third case 62 may be carried individually. The handle 38 is gripped and the first case 12 is tilted rearwardly onto the rollers 28 for transporting the first 12, second 46 and third 62 cases.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fishing equipment storage assembly being configured to store and transport fishing equipment, said assembly comprising:
   a first case having a length of at least 2.0 meters for accommodating a length of a fishing pole for storage;
   a pair of rollers, each of said rollers being rotatably coupled to said first case wherein each of said first rollers is configured to roll along a support surface for transporting said first case;
   a handle being coupled to and extending partially around said first case for gripping and thusly transporting said first case;
   a second case being coupled to said first case wherein said second case is configured to contain fishing tackle for transporting the fishing tackle with the fishing pole; and
   a third case being removably positionable on said second case for transporting said third case, said third case having fishing tackle being contained therein for transporting the fishing tackle.

2. The assembly according to claim 1, wherein:
   said first case has a top end, a bottom end and an outer wall extending therebetween, said outer wall having a front side, a back side, a first lateral side and a second lateral side;
   each of said rollers is positioned on a respective one of said first and second lateral sides of said outer wall of said first case, each of said rollers being aligned with said bottom end of said first case; and
   said handle has a first end and a second end, each of said first and second ends being coupled to a respective one of said first and second lateral sides of said outer wall of said first case, said handle having a sequence of bends thereon such that said handle extends around said back side of said outer wall of said first case, said handle being centrally positioned between said top and bottom ends of said first case.

3. The assembly according to claim 2, wherein:
   said second case has a front end, a back end and a top side, said front end being open, said back end being coupled to said front side of said outer wall of said first case, said second case extending upwardly from said bottom end of said first case, said front end being open for receiving the fishing tackle; and
   said top side having a plurality of wells each extending downwardly therein, said wells being aligned with a respective one of four corners of said top side.

4. The assembly according to claim 1, further comprising:
   a plurality of wells extending into said second case;
   said third case has a bottom side and a forward side, said forward side being open; and
   a plurality of pegs, each of said pegs being coupled to and extending downwardly from said bottom side of said third case, each of said wells in said second case insertably receiving a respective one of said pegs when said third case is positioned on said second case such that said third case is inhibited from sliding off of said second case.

5. A fishing equipment storage assembly being configured to store and transport fishing equipment, said assembly comprising:
   a first case having a length of at least 2.0 meters for accommodating a length of a fishing pole for storage, said first case having a top end, a bottom end and an outer wall extending therebetween, said outer wall having a front side, a back side, a first lateral side and a second lateral side;

a pair of rollers, each of said rollers being rotatably coupled to said first case wherein each of said first rollers is configured to roll along a support surface for transporting said first case, each of said rollers being positioned on a respective one of said first and second lateral sides of said outer wall of said first case, each of said rollers being aligned with said bottom end of said first case;

a first lid being hingedly coupled to said first case for closing said first case, said first lid being positionable in a closed position for closing said first end, said first lid being positionable in an open position to expose said first end;

a handle being coupled to and extending partially around said first case for gripping and thusly transporting said first case, said handle having a first end and a second end, each of said first and second ends being coupled to a respective one of said first and second lateral sides of said outer wall of said first case, said handle having a sequence of bends thereon such that said handle extends around said back side of said outer wall of said first case, said handle being centrally positioned between said top and bottom ends of said first case;

a second case being coupled to said first case wherein said second case is configured to contain fishing tackle for transporting the fishing tackle with the fishing pole, said second case having a front end, a back end and a top side, said front end being open, said back end being coupled to said front side of said outer wall of said first case, said second case extending upwardly from said bottom end of said first case, said front end being open for receiving the fishing tackle, said top side having a plurality of wells each extending downwardly therein, said wells being aligned with a respective one of four corners of said top side;

a second lid being hingedly coupled to said second case for closing said second case, said second lid being positionable in an closed position to close said front end, said second lid being positionable in an open position to expose said front end;

a third case being removably positionable on said second case for transporting said third case, said third case having fishing tackle being contained therein for transporting the fishing tackle, said third case having a bottom side and a forward side, said forward side being open;

a third lid being hingedly coupled to said third case for closing said third case, said third lid being positionable in an open position to expose said forward side, said third lid being positionable in a closed position to close said forward side; and a plurality of pegs, each of said pegs being coupled to and extending downwardly from said bottom side of said third case, each of said wells in said second case insertably receiving a respective one of said pegs when said third case is positioned on said second case such that said third case is inhibited from sliding off of said second case.

* * * * *